March 16, 1965  POON YUEN SANG  3,173,240
EXPANSIBLE BRACELET
Filed Dec. 13, 1961  2 Sheets-Sheet 1
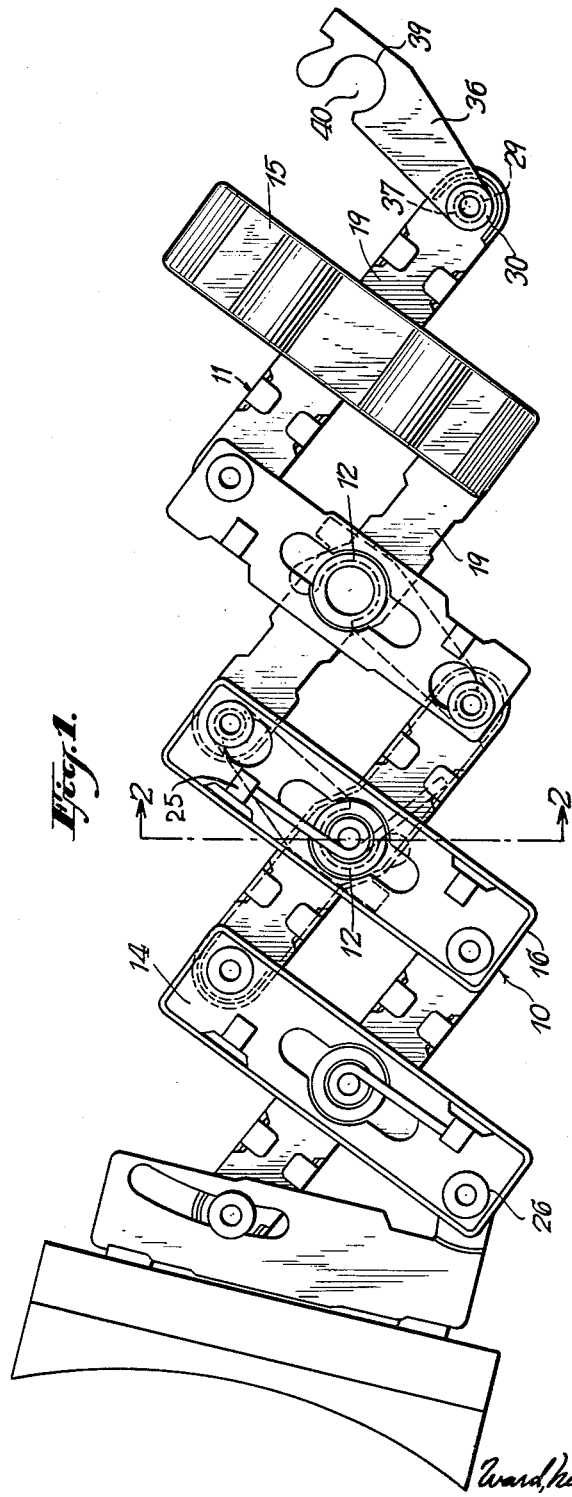
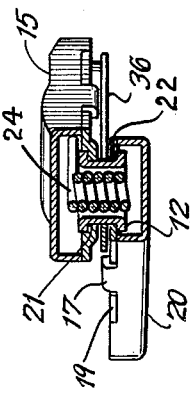
INVENTOR.
POON YUEN SANG.
BY
Ward, Neal, Haselton, Orme & McChannon
ATTORNEYS.

March 16, 1965 POON YUEN SANG 3,173,240
EXPANSIBLE BRACELET
Filed Dec. 13, 1961 2 Sheets-Sheet 2
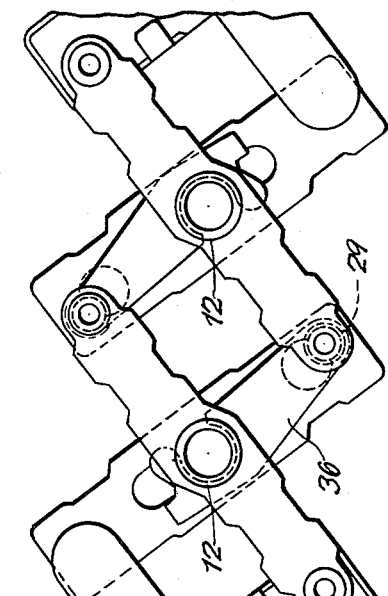
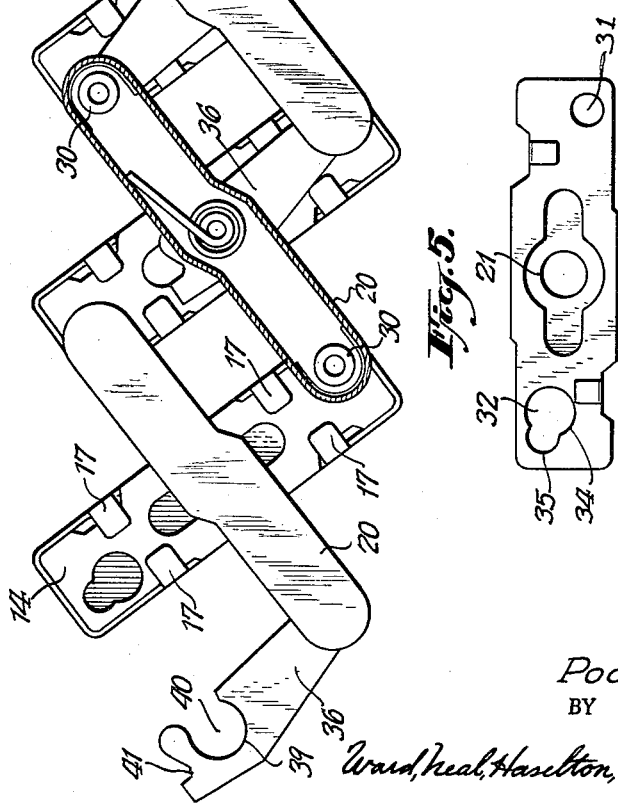
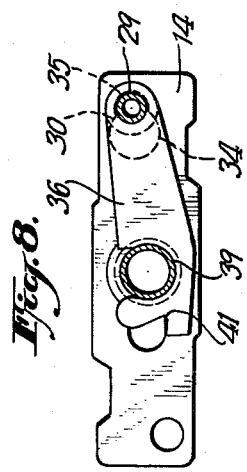
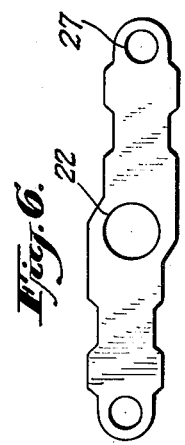
INVENTOR.
POON YUEN SANG.
BY
Ward, Neal, Haselton, Orme & McElhannon
ATTORNEYS.

United States Patent Office 3,173,240
Patented Mar. 16, 1965

3,173,240
EXPANSIBLE BRACELET
Poon Yuen Sang, Hong Kong, assignor to Baldwin Bracelet Corporation, New York, N.Y., a corporation of New York
Filed Dec. 13, 1961, Ser. No. 159,076
Claims priority, application Great Britain, July 7, 1961, 24,685/61
5 Claims. (Cl. 59—79)

This invention relates generally to expansible bracelets, and more particularly, to means for connecting and locking together links which make up such bracelets.

It is desirable in the jewelry art that expansible bracelets be conveniently lengthened or shortened by the addition or removal of links so as to properly fit users having wrists of different sizes. For this purpose, detachable connections for links utilized in such bracelets have already been proposed utilizing a pin and slot connection. However, such expedients as are now known in the art are so constructed as to become disconnected unintentionally or, in order to avoid such unintentional disconnection, have been designed to make a series of sequential steps necessary to effect connection and disconnection, these steps being unlikely to occur by chance. Moreover, such sequence of maneuvers required to effect connection and disconnection of the links of bracelets are rather intricate and, because of the small size of the parts involved, are often difficult to effect intentionally, requiring sliding and twisting or tilting of the links relatively to one another thus making the procedure difficult and cumbersome.

I have conceived by my invention a novel construction which contributes to the art an exceedingly simple and effective means whereby links of an expansible bracelet may be readily connected or disconnected by a relatively simple and uncomplicated manipulation and which nevertheless retains the links in assembled relation with no chance of them being disconnected unintentionally.

In accordance with the invention an expansible bracelet having a pair of links is provided with means for detachably connecting said links together comprising aperture means formed in a surface of one link and projecting means extending from the opposed surface of the other link and adapted to interlock with said aperture means, and a locking element mounted between the links and movable to a position in which it restricts movement of the projecting means and thereby withdrawal of the latter from the aperture means.

There has thus been outlined rather broadly the more important features of the invention in order that the detailed description thereof that follows may be better understood, and in order that the present contribution to the art may be better appreciated. There are, of course, additional features of the invention that will described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a plan view of a portion of an expansible bracelet, with certain parts removed or in section for the sake of clearness;

FIG. 2 is a cross-section on the line 2—2 of FIG. 1;

FIG. 3 is an inverted plan view of a portion of the bracelet of FIGS. 1 and 2, with certain parts removed or in section;

FIGS. 4 and 5 are respectively a side elevation and a plan of a base plate for an upper link of the bracelet;

FIG. 6 is a plan of a base plate for a lower link of the bracelet;

FIG. 7 is a plan view of a locking plate or element used in accordance with the invention; and FIG. 8 is an inverted plan view of the base plate of FIGS. 4 and 5 with the locking plate of FIG. 7 applied thereto.

Referring now to the drawings, there is shown a portion of a bracelet comprising links of the type herein contemplated. The upper links 10 and lower links 11 are connected in the well known manner of lazy tongs, that is, each pair of upper and lower links are centrally pivoted to one another by means of a hollow headed pivot pin or eyelet 12, and the ends of each link are also pivoted to the ends of opposite adjacent links, respectively.

As shown, the upper links 10 each comprise a base plate 14, and an ornamental shell 15 which includes a peripheral flange 16. The shell 15 is fixed to the base plate 14 by means of bendable tabs 17 integral with the flange 16. The lower links 11 also comprise a base plate 19 and shell 20, the particular parts of the upper and lower links, such as the shells, being shaped as desired. The pivot pins 12 pass through central holes 21 and 22 in the base plate 14 and 19 respectively.

Torsion springs 24 pass through the central pivot pins 12 and have arms which engage suitable tongues such as 25 provided at the interiors of the links 10 and 11 to bias the same towards a parallel disposition relatively to one another.

The construction described thus far is conventional in the art and is set forth here to provide an understanding of the present invention.

The base plates 19 of the lower links 11 have a substantially flat surface and are provided with a headed hollow rivet or pin 26 secured within and projecting outwardly from holes 27 (see FIG. 6) adjacent each end of the base plate. Each rivet or pin has a shank 29 which is cylindrical in shape, and an enlarged head 30 at its outer end. Preferably, each head has plane, parallel inner and outer faces at right angles to the axis of its shank 29, as illustrated.

Adjacent one end of the base plate 14 of each upper link 10 there is formed a hole 31 (see FIG. 5) for the engagement of a rivet 26 which serves to secure one end of a lower link with one end of an upper link. The other end of each base plate 14 is formed adjacent thereto with an aperture 32. While these apertures may take any suitable shape, I have found it convenient to define them each with a large portion 34 and a smaller portion 35 communicating with the large portion. The large portion 34 of the aperture 32 is dimensioned freely to permit passage therethrough of the head 30 of the rivet 26, while the small portion of the aperture is of a size to seat the shank 29 of the rivet.

Once the rivet head 30 is passed through the large portion 34 of the aperture 32 and the shank 29 moves into the smaller portion 35, it is desired that the links 10 and 11 be prevented from becoming inadvertently disconnected as by flexure of the bracelet while putting it on or removing it from one's wrist or due to natural movements of the wrist. For this purpose a locking element or member 36 is provided which is shown separately in FIG. 7. This locking element 36 is of flat or plate form and has a hole 37 at one end of a diameter which permits the locking plate to be mounted upon the shank 29 of a rivet 26. The rivet 26 upon which the locking plate is mounted is that rivet associated with the aperture 32 in the base plate 14 of each upper link. The outer or free end of the locking plate is formed with a recess 39 of a shape and diameter which permits it to surround a substantial portion of the shank portion of the headed hollow pivot pin 12 about which upper and lower links are centrally pivoted. This recess 39 is somewhat greater than a semi-circle and thus has an opening 40 of a dimension slightly less than that of the shank diameter of the associated pivot pin 12. The entry edges of opening 40 are rounded in order to facilitate clipping of the locking plate into position with the recess 39 around its associated pivot pin 12.

As will be noted from FIGS. 1 and 2 the locking plates 36 are mounted during assembly between upper and lower links so that they can pivot relatively to and between the latter about the connecting rivets 26. During such assembly and with the shank of the rivet 26 in the smaller portions 35 of the aperture 32, each locking plate 36 is pushed to pivot about its rivet 26 and the outer end of the locking plate is clipped into position by forcing it against its associated pivot pin 12. By this means the shank of pivot pin 12 is forced to pass through the opening 40 of recess 39 and, as the latter is somewhat greater than a semi-circle, more than half of the shank of the pivot pin 12 is located in recess 39 and the outer end of the locking plate securely held thereby. Further, with the locking plate in this position, it effectively fixes the rivet 26 in its place in the smaller portion 35 of aperture 32. Thus, movement of the shank of the rivet 26 from the smaller portion 35 to the larger portion 34 of aperture 32 is prevented, and thereby removal of the upper link from the rivet is prevented.

As will be seen particularly from FIG. 7, the locking plate is provided with a notch 41 at its outer end adjacent the aperture 39 for facilitating movement of the locking plate by any suitable small pointed tool inserted into the notch 41. When it is desired to add or remove links, it is a simple matter to turn the respective locking plate 36 about its pivot to free its outer end from the shank of the pivot pin 12. With the outer end of the locking plate free, the rivet 26 can then be moved to a position in which the head 30 of the rivet can pass through the larger portion 34 of the aperture 32.

I believe that the construction and operation of my invention will now be understood, and that the advantages thereof will be fully appreciated by those persons skilled in the art.

I now claim:

1. An expansible bracelet of the class described comprising a pair of links and means for detachably connecting said links together, said means comprising aperture means formed in a surface of one link and projecting means extending from the opposed surface and adjacent one end of the other link and adapted to interlock with said aperture means, and a locking element mounted between the links and non-releasably, pivotally mounted on said projecting means movable to a position in which it restricts movement of the projecting means and thereby withdrawal of the latter from the aperture means.

2. An expansible bracelet of the class described comprising a pair of links, a pin projecting from a surface and adjacent one end of one of said links and an aperture in an opposed surface of the other of said links, said pin having a shank and an enlarged head at its outer end, said aperture being dimensioned to receive said enlarged head and to interlock with said pin shank, and a locking element non-releasably pivotally mounted on said pin shank and movable to a position in which it restricts movement of said pin and thereby withdrawal of the latter from said aperture.

3. An expansible bracelet of the class described comprising a pair of links one of which is formed of an outer shell with peripheral flanges and a liner secured to said shell within said flanges, and means for detachably connecting said links together comprising an aperture in said liner and a pin projecting from a surface and adjacent one end of the other of said pair of links, said pin having a shank and an enlarged head at its outer end dimensioned to pass through said aperture, and a locking element between the links and having a hole through which said pin extends whereby said locking element is mounted for pivotal movement relatively to said pin, said locking element being movable to a position in which it restricts movement of said pin and thereby withdrawal of the latter from said aperture.

4. In an expansible bracelet of the class described comprising a pair of links, pin means centrally connecting said links for pivotal movement relatively to one another and means for detachably connecting said links to a second similarly connected adjacent pair of links, said means comprising an aperture in a surface of one of said links of one pair, said aperture having a large portion and a smaller portion communicating therewith, and a headed pin extending from a surface and adjacent one end of a link of said second pair and having a shank and an enlarged head at its outer end so dimensioned as to pass through the large portion of said aperture, said shank being adapted to seat in the small portion of said aperture, and a locking element formed with a recess adjacent one end of a size and shape permitting same to releasably interlock with said pin means and having a hole adjacent its other end through which said headed pin extends whereby said locking element is mounted for non-releasable pivotal movement relatively to said headed pin, said locking element being movable to and from interlocking position relatively to said pin means, said locking element resisting movement of said headed pin from said aperture when interlocked with said pin means.

5. In an expansible bracelet of the class described comprising a pair of links, pin means centrally connecting said links for pivotal movement relatively to one another and means for detachably connecting said links to a second similarly connected adjacent pair of links, said means comprising an aperture in a surface of one of said links of one pair, said aperture having a large portion and a smaller portion communicating therewith, and a headed pin extending from a surface and adjacent one end of a link of said second pair and having a shank and an enlarged head at its outer end so dimensioned as to pass through the large portion of said aperture, said shank being adapted to seat in the small portion of said aperture, a locking element formed with a recess adjacent one end of a size and shape permitting same to releasably interlock with said pin means and having a hole adjacent its other end through which said headed pin extends whereby said locking element is mounted for non-releasable pivotal movement relatively to said headed pin, said locking element being movable to and from interlocking position relatively to said pin means, said locking element resisting movement of said headed pin from said aperture when interlocked with said pin means, and a notch formed in the free end of said locking element to facilitate movement thereof by a tool.

References Cited by the Examiner

UNITED STATES PATENTS

| 2,781,631 | 2/57 | Showell | 59—79 |
| 2,838,906 | 6/58 | Valcourt | 59—79 |
| 3,018,616 | 1/62 | Ebert | 59—79 |

FOREIGN PATENTS

| 841,596 | 7/60 | Great Britain. |

WILLIAM J. STEPHENSON, *Primary Examiner.*

HUNTER C. BOURNE, JR., *Examiner.*